Feb. 12, 1924. 1,483,473
F. H. NORTON
METHOD AND APPARATUS FOR DETERMINING PHOTOGRAPHIC EXPOSURES
Original Filed May 26, 1921
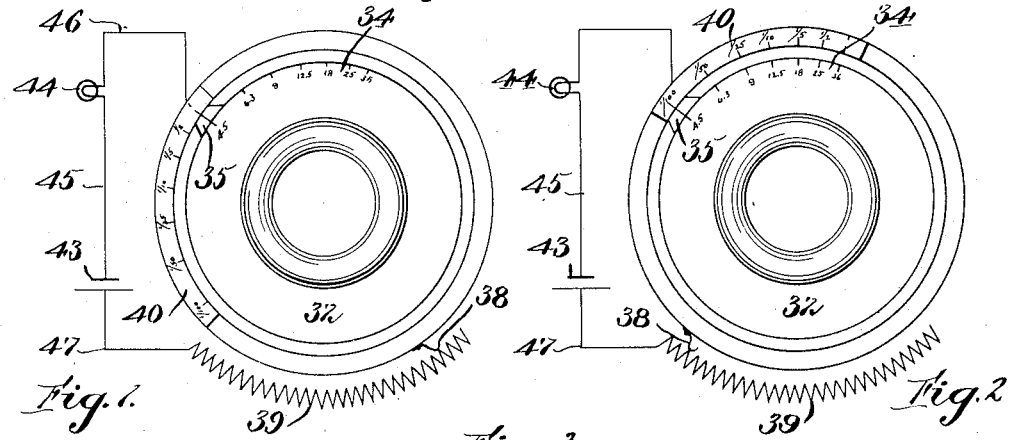
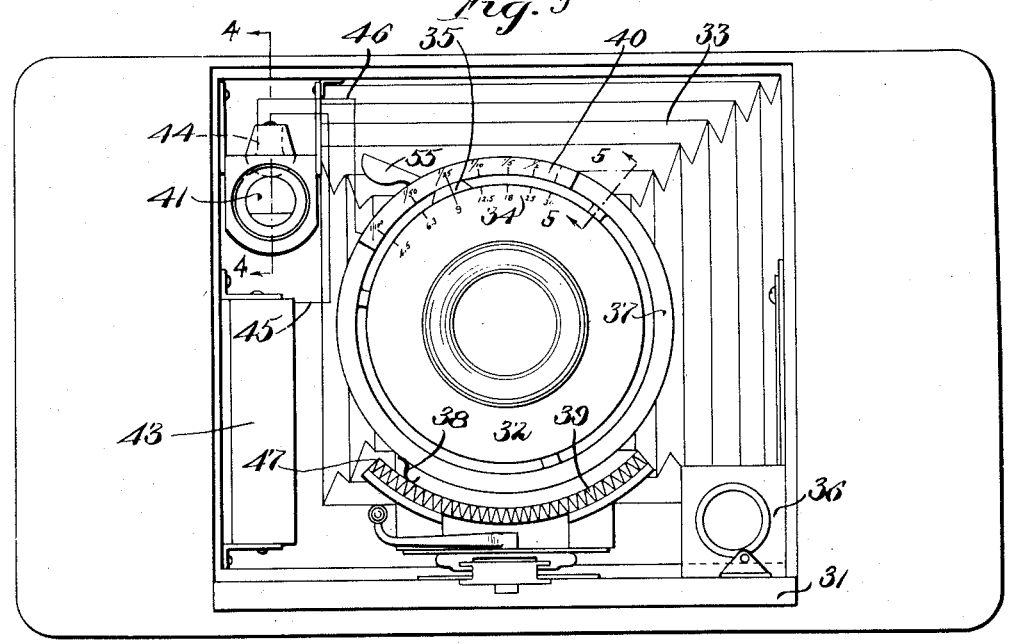
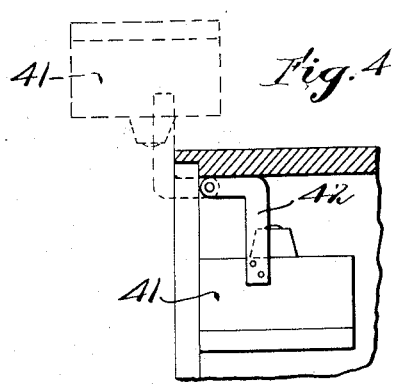
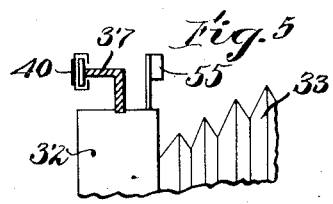
Inventor;
Frederick H. Norton,
by Roberts, Roberts & Cushman
his attys.

Patented Feb. 12, 1924.

1,483,473

UNITED STATES PATENT OFFICE.

FREDERICK H. NORTON, OF HAMPTON, VIRGINIA.

METHOD AND APPARATUS FOR DETERMINING PHOTOGRAPHIC EXPOSURES.

Original application filed May 26, 1921, Serial No. 472,842. Divided and this application filed March 3, 1922. Serial No. 540,755.

*To all whom it may concern:*

Be it known that I, FREDERICK H. NORTON, a citizen of the United States of America, and resident of Hampton, in the county of Elizabeth City and State of Virginia, have invented new and useful Improvements in Methods and Apparatus for Determining Photographic Exposures, of which the following is a specification.

This invention relates to photography and to photometric measurement ancillary thereto, and is a division of my copending application, Serial No. 472,842, filed May 26, 1921.

The principal objects of the invention are to provide a method of and means for determining light values which is quick and accurate, which while preferably utilizing an electric cell does not depend upon the constancy of the potential produced by the cell, and which may be employed in conjunction with the adjustable exposure opening or other exposure adjustment of any type of camera including a folding camera.

In one aspect the present invention comprises comparing the unknown illumination, for example the illumination of an object field to be photographed, with a variable illumination, preferably light from an electric lamp energized by an electric cell, the variable illumination first being adjusted to a predetermined value, and then adjusted with reference to the first adjustment an amount sufficient to bring the two illuminations into a known proportionate relationship, whereby the value of the unknown illumination will be indicated by the amount of said second adjustment. For example, when using an electric lamp and cell, the first adjustment may be effected by varying the resistance of the circuit until the incandescent filament just begins to glow, and the second adjustment may be effected by varying the resistance until the illumination of the lamp is substantially equal to the unknown illumination. In this way variations in the potential of the cell are compensated for, owing to the fact that the light from the lamp varies with the resistance of the circuit in approximately the same ratio at different cell potentials (within a certain range) when starting from the point at which the filament begins to glow. This will be clear from the following examples.

First, with the cell fully charged, move the rheostat up to the point where the filament begins to glow and then to the point where the lamp produces one candle-power; secondly, with the cell somewhat below full charge, repeat the operations. While the filament will begin to glow at different points in the two examples, and the one candlepower will be attained at different points, the distance between the two points of adjustment in the second example will be approximately the same as the distance between the two points in the first example.

As is well-known cameras are provided with various types of mechanism for varying the exposure of the film or other sensitized element. For example, the most common type of camera has mechanism for varying the exposure aperture and mechanism for varying the shutter speed; and cameras provided with focal plane shutters usually have additional mechanism for varying the exposure opening in the shutter, either by varying the width of a single opening or by bringing into play one of several openings of different widths.

In another aspect the invention comprises a unique correlation between the aforesaid variable illumination and the variable mechanism for varying the exposure of the sensitized element, and a conjunctive adjustment of the two variable factors. In the ordinary camera, for example, the exposure scale associated with the variable illumination mechanism may be so correlated with the aperture scale that when the exposure scale is set in a predetermined relation to the aperture scale at the end of the first adjustment of the variable illumination, the second adjustment of the variable illumination will bring the exposure scale into such position relative to the aperture scale that the proper exposure will be indicated on the exposure scale for any aperture adjustment.

In order more clearly to set forth the aforesaid and other aspects of the invention, I have illustrated a concrete embodiment of the invention in the accompanying drawings, in which:

Fig. 1 is a diagrammatic view of the embodiment;

Fig. 2 is a similar view showing the parts in a different position of adjustment;

Fig. 3 is a front elevation of the folding camera having invention applied thereto, the camera being open and the bellows being extended;

Fig. 4 is a detail section on line 4—4 of Fig. 3, parts being shown in elevation; and Fig. 5 is a detail section on the line 5—5 of Fig. 3, parts being shown in elevation.

The particular embodiment shown comprises a camera box 30 of the folding type, the box having a hinged door 31 upon which the carriage 32, carrying the usual lens, diaphragm and shutter, is adapted to slide when the bellows 33 are extended. 34 indicates the aperture scale; 35 the aperture-controlling member having an index line adapted to indicate the size of the aperture on the scale 34, 55 the shutter lever, and 36 the view finder. All of this construction is similar to that embodied in an early type of camera manufactured by the Bausch & Lomb Optical Company.

According to the present invention a ring 37 is mounted to rotate about the housing 32 in any suitable manner, as for example as shown in Figs. 3 and 5. The ring 37 carries a contact member 38 adapted to wipe over the resistance element 39 mounted on the carriage concentrically with the ring. An exposure scale 40 is adjustably mounted on the ring 37 so that it may be adjusted circumferentially of the ring. The scale 40 is so positioned that the index 35 is adapted to register therewith, as well as with scale 34.

A view device 41 is mounted on a bracket 42 pivoted to the box 30 so that the device may be folded into the box as indicated in Fig. 3 and as indicated by the full lines in Fig. 4, or it may be swung out into the position indicated by the broken lines in Fig. 4. The dry-cell 43 may be mounted beneath the device 41 in an otherwise unoccupied position when the camera is closed, as indicated in Fig. 3. The lamp 44 in the view device 41, the cell 43, the resistance 39 and the contact 38 may be connected in series in any suitable manner, but for the purpose of illustration I have shown them in Fig. 3 as connected by wires 45, 46 and 47, the wire 46 connecting with terminal 38 through the ring 37.

The operation of the embodiment shown in Figs. 1 to 5 is as follows: With the bellows extended and with the view device 41 swung into the position shown by the broken lines in Fig. 4 the ring 37 is rotated, thereby moving the contact 38 along the resistance 39, until the filament of lamp 44 begins to glow. The scale 40 is then adjusted along ring 37 into a predetermined relationship to the scale 34, for example until the right-hand end of scale 40 registers with the left-hand end of scale 34 or with the index 35 when set at the left-hand end of scale 34, the left-hand end of scale 34 or member 35 thus serving as an index for scale 40. The parts are shown in this position in Fig. 1. The ring 37 is then rotated until the illumination produced by the lamp 34 is substantially equal to the illumination of the object field, this being determined by looking through the view device 41. The parts are then in the position shown in Fig. 2. After the scale 40 has been thus adjusted, the proper exposure for any aperture opening is indicated by index 35 on scale 40. For example with the index member 35, which controls the aperture opening, set at f 4, 5, the proper exposure is 1/100 second, as indicated in Fig. 2. If the index member 35 be moved to f 9, the proper exposure is 1/25 second, as indicated in Fig. 3.

I claim:

1. The method of determining the exposure of a sensitive element which comprises comparing a variable illumination with the illumination to which said element is to be exposed, and conjunctively adjusting the light opening through which said element is to be exposed and the variable illumination so that the proper exposure is indicated for any opening adjustment.

2. The method of determining the exposure of a sensitized element which comprises comparing a variable illumination with the illumination to which said element is to be exposed, adjusting the light opening through which said element is to be exposed to a predetermined size, adjusting said variable illumination with reference to said opening adjustment to bring it to a predetermined intensity, again adjusting the variable illumination with reference to the first adjustment an amount sufficient to bring the two illuminations into a known proportionate relationship, the last adjustment bringing the variable illumination and light opening adjustments into such relationship that the correct exposure is indicated for any subsequent opening adjustment.

3. A device of the character described comprising means for exposing a sensitized element through a light opening, means for comparing a variable illumination with the illumination to which said element is to be exposed, and means conjunctively adjusting the light opening through which said element is to be exposed and the variable illumination so that the proper exposure is indicated for any opening.

4. A device of the character described comprising means for exposing a sensitized element through a light opening, means for comparing a variable illumination with the illumination to which said element is to be exposed, means for varying said light opening, means for adjusting said variable illumination, and a scale cooperating with both said last named means to indicate the correct exposure for any adjustment of said light opening.

5. A device of the character described comprising means for exposing a sensitized element through a light opening, means for comparing a variable illumination with the illumination to which said element is to be exposed, means for varying said light opening including an index member movable relatively to a light-opening scale, means for producing two adjustments of said variable illumination, first to a predetermined value independent of the value of the unknown illumination and secondly to a value having a known proportionate relationship to the unknown illumination, said last means having an exposure scale correlated with said opening scale and index member so that when the exposure scale is set in a predetermined relationship to the opening scale at the end of said first adjustment then after said second adjustment said index member will indicate the proper exposure on the exposure scale at any setting thereof relatively to the opening scale.

6. A device of the character described comprising means for exposing a sensitized element through an aperture, means for comparing a variable illumination with the illumination to which said element is to be exposed, means for varying said aperture including an index member movable relatively to an aperture scale, means for varying said variable illumination until it bears a predetermined relationship to the exposure illumination, said last means having a scale associated with said index member to indicate the proper exposure, said scales being correlated so that when said last means is properly adjusted said index member will indicate the proper exposure on the exposure scale at any setting thereof relatively to the aperture scale.

7. A device of the character described comprising means for exposing a sensitized element, said means being adjustable to vary the degree of exposure, means for comparing a variable illumination with the illumination to which said element is to be exposed, and correlated means for varying said exposure means and said variable illumination.

8. A device of the character described comprising an aperture scale, an exposure scale, an index device associated with both scales, the scales being adjustable relatively to each other and being correlated so that when properly adjusted relatively to each other the index device will indicate the proper exposure on the exposure scale when set at any point on the aperture scale.

9. A device of the character described comprising means for exposing a sensitized element including an extension bellows collapsible into a box, and means for determining the value of the illumination to which said element is to be exposed, said last means including a view device normally within said box and extensible outside the box when said bellows is extended.

10. A device of the character described comprising a camera box, aperture and shutter mechanism carried by said box, and means for comparing a variable illumination with the illumination from the object field, said last means including mechanism associated with said first mechanism for adjusting the variable illumination, and a view device carried by the box for making the comparison.

Signed by me at Hampton, Va., this twenty-third day of February, 1922.

FREDERICK H. NORTON.